Figure 1:
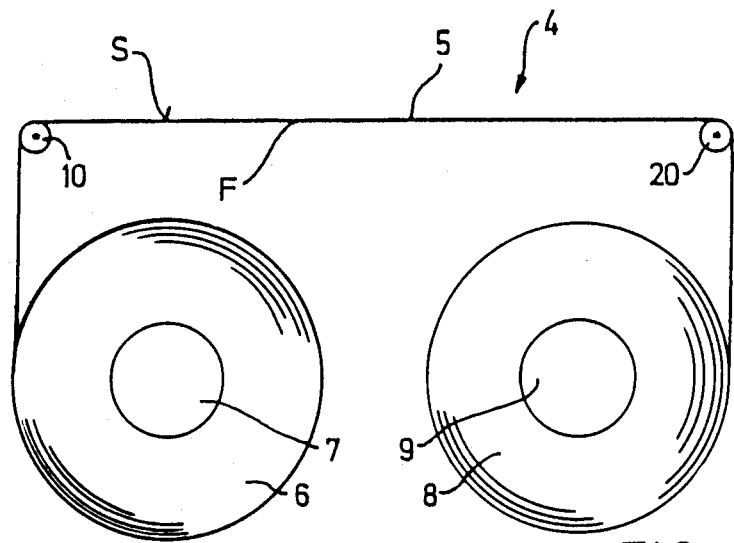

United States Patent [19]

Roos et al.

[11] Patent Number: 4,751,601
[45] Date of Patent: Jun. 14, 1988

[54] TAPE GUIDE SYSTEM FOR MAGNETIC TAPES, ESPECIALLY VIDEO TAPES

[75] Inventors: Roland Roos; Klaus D. Schomann, both of Ludwigshafen; Wulf Muenzner, Frankenthal, all of Fed. Rep. of Germany

[73] Assignee: BASF Aktiengesellschaft, Ludwigshfen, Fed. Rep. of Germany

[21] Appl. No.: 929,267

[22] Filed: Nov. 10, 1986

Related U.S. Application Data

[60] Division of Ser. No. 738,578, May 28, 1985, Pat. No. 4,667,261, which is a continuation of Ser. No. 411,871, Aug. 26, 1982, abandoned.

[30] Foreign Application Priority Data

Sep. 3, 1981 [DE] Fed. Rep. of Germany ....... 3134894

[51] Int. Cl.⁴ .............................................. G11B 15/60
[52] U.S. Cl. ........................ 360/130.21; 360/130.22; 226/196
[58] Field of Search ........................ 360/130.2–130.24, 360/132; 226/186, 196–198; 242/76, 196

[56] References Cited

U.S. PATENT DOCUMENTS

| | | | |
|---|---|---|---|
| 3,093,284 | 6/1963 | Mullin | 226/186 X |
| 4,204,654 | 5/1980 | Gebeke | 226/196 X |
| 4,276,575 | 6/1981 | Schoettle | 226/196 X |
| 4,310,863 | 1/1983 | Lelandais | 360/130.21 X |
| 4,382,565 | 5/1983 | Shiba | 226/196 X |

*Primary Examiner*—S. J. Heinz
*Attorney, Agent, or Firm*—Keil & Weinkauf

[57] ABSTRACT

A tape guide system wherein a magnetic tape having different resistivities on its back and front travels in contact with guide elements, the members of these elements which are in contact with the tape being matched to the relevant face of the tape in respect of surface resistivity and/or charge affinity. The members contacting the front of the magnetic tape accordingly consist of a conductive or low-insulation material and the members contacting the back of the tape consist of a high-insulation material. In alternative embodiments, the contact members can consist of a material of low conductivity, or of a plastic with an added conductive material. The novel guide system can be used in any type of high-speed magnetic tape transport mechanism. The invention also concerns the tape guide elements per se, and magnetic tape cassettes employing the tape guide system.

20 Claims, 3 Drawing Sheets

TAPE GUIDE SYSTEM FOR MAGNETIC TAPES, ESPECIALLY VIDEO TAPES

This is a division of application Ser. No. 738,578, filed May 28, 1985, now U.S. Pat. No. 4,667,261, which in turn is a continuation of application Ser. No. 411,871, filed Aug. 26, 1982, now abandoned.

The present invention relates to a tape guide system for magnetic tapes, especially video tapes, comprising tape guide elements which are at least partially in contact with the film face, ie. back, and coated face, ie. front, of the magnetic tape, the film face and the coated face having different surface resistivities.

The invention also relates to a tape guide system for magnetic tapes, especially video tapes, comprising tape guide elements which are partially in contact with the film face (back) and with the coated face (front) of the magnetic tape, the film face and the coated face having different charge affinities.

The invention moreover relates to magnetic tape cassettes and to tape guide elements for tape guide systems.

A plurality of tape guide systems are known from magnetic tape recorders for audio, video and data signals. Moreover, a great variety of tape guide elements such as rollers, pins, etc. are used in magnetic tape cassettes.

Moreover, it is known that as the tape transport speed is increased the electrostatic charges acquired by the components which move in frictional contact, such as the tape and the tape guide elements, also increase and cause sticking of the tape to such elements, especially on start-up of the magnetic tape transport apparatus.

German Laid-Open Application DOS No. 3,010,772 discloses magnetic tape cassettes for audio recording on metal film magnetic tape, wherein a discharging and earthing member is provided within the cassette and produces a conductive connection from the front of the magnetic tape to an earthed contact on the apparatus. The use of such a special component requires changes to the cassette and adaptation of the apparatus, and is to be avoided in a cassette system because of the expense it entails. An application of the above proposal to tape guide elements has not been disclosed, nor is it obvious.

Moreover, U.S. Pat. No. 3,062,464 discloses a tape transport system with a pneumatic tape chamber, wherein sticking of the tape to the wall of the chamber is avoided by providing the wall in a rough layer of poor conductivity, the roughness reducing the generation of frictional electricity whilst any charge which may already be present on the tape is removed by discharge through the material constituting the coating.

The use of such rough materials is thus known, as a type of paint coat, for relatively large surfaces. Its application in the case of the tape guide elements of the present invention has not been proposed, nor it is obvious.

In video cassettes, it has been found that a magnetic tape bearing a certain type of magnetic layer will, on rereeling, stick—at least intermittently—to the guide rollers and guide pins.

It is an object of the present invention to eliminate this sticking effect and moreover to provide means which, in all types of magnetic tape equipment and especially in magnetic tape cassettes, reduce or even completely prevent, from the outset, the occurrence of such sticking.

We have found that this object is achieved, according to the invention, with a tape guide system of the type mentioned at the outset, wherein the contact members of the passive tape guide elements respectively allotted to the film face and coated face of the tape consist of a material whose surface resistivity is of the same order as that of the respective face of the tape. "Passive" tape guide elements as used herein are elements which guide but do not drive the tape—although, if they are, for example, in the formm of rollers, they may be rotated by the tape.

Moreover, we have found that the stated object is also achieved if the contact members respectively allotted to the film and coated face of the tape consist of a material which has a surface whose charge affinity is of the same order as the respective charge affinities of the said tape faces.

"Contact members" means, for the purposes of the present invention, those membes of the tape guide element which are at least intermittently in contact with the front and back of the magnetic tape, respectively. This at least reduces the possibly of different amounts of charge building up on the tape and the element. In practice, the tape guide elements are made from a material having the appropriate surface resistivity, or their surfaces are provided with such a material.

In one design of a novel magnetic tape cassette with tape guide elements for the front and back of the tape, the contact members of the element for the front of the tape are made from a conductive or low-insulation material, and the element for the back of the tape from a high-insulation material.

In an advantageous design of a novel magnetic tape cassette having a chromium dioxide tape and guide elements for the front and back of the tape, the contact members of the element for the front consist of metal and those for the back consisting of an insulator. In this way, magnetic tape cassettes, especially those with high winding speeds, can be designed to be free from electrostatic charges, thereby avoiding tape transport and tape winding problems which normally lead to audible and-/or visible errors on reproduction.

It is also simple to replace the complete guide elements or only to substitute a different surface, for example by sliding a sleeve, or sticking a film, over the element, the sleeve or film consisting of a material adapted according to the invention.

It is moreover very advantageous if the contact members of the elements are made of a material of poor conductivity having a surface resistivity of up to $10^5 \Omega$(ohms).

As a result, fricton against the guide elements a from the outset generates only a negligible amount of electrostatic charge.

Moreover, there results the advantage that a charge transported by the magnetic tape can be conducted away through the material, so that the total amount of charge in the tape system, whether on a magnetic tape transport apparatus or in a cassette, can be reduced.

In another advantageous embodiment of the invention, the contact members of the guide elements allotted to the front of the tape are made from a plastic containing an electrically conductive additive, for example graphite or carbon.

This makes it possible to vary the conductivity of the contact members in the range of from a poor conductor to an insulator by appropriate choice of the amount of additive.

At the same time, the frictional forces between the back or front of the tape and the guide elements are reduced, as a result of which the tape is stressed to a lesser extent and its life is increased.

The use of such additives also makes it possible to vary the surface character of guide elements within wide limits, including matching the roughness of the guide elements to the usual roughness of the tape base, which in the case of video tapes is less than 0.5 μm.

According to the invention it is also advantageous if a tape guide system in which a magnetic tape runs with its back and front at least partially in contact with tape guide elements is so designed that the contact members of the tape guide elements allotted to the back of the tape consist of a material whose surface has the same charge affinity as that of the tape base, for example, by providing the said surface with a piece of film. This permits very reliable material matching in the sense of the present invention. As an alternative, the contact members may be made of a plastics material having approximately the same properties as the tape base.

In such a tape system essentially comprising a supply reel, tape guide elements for the front and/or back of the tape, and a take-up reel, electrostatic charges can arise at the following points of the system:

Friction between the tape and the guide elements generates frictional electricity or electrostatic induction and both the elements, namely the tape and the guide element, acquire an electrostatic charge. Such a charge can be additionally produced on each element by distribution of the charges already present.

Moreover, unwinding the magnetic tape from the outermost turn of the supply reel can cause a charge separation between the unwound tape and the outermost turn remaining on the reel, thus creating a high voltage. Normally, a separation between positive and negative charges occurs, these separated charges being transported onwards on the corresponding parts of the tape.

In neither case it is posible to differentiate between electrostatic charge generation and separation and accordingly the quantities and signs of the charges also depend on the dielectric constants of the material. The material with the greater relative dielectric constant acquires a positive charge.

Another factor of importance is the "charge affinity" which determines which surface of which body carries what quantity of charge at a given point in time.

This "charge affinity" can be determined by a pulloff test, wherein plates carrying the strips of material to be tested are brought into contact and pulled apart, the voltage thus generated being measured. Thus, "charge affinity" as used herein is defined as the ability of a body to gather electrical charges on its surface, this ability being expressed in terms of the voltage produced in a pull-off test in which plates carrying the strips of material to be tested are brought into contact with each other and the pulled apart.

The above comments concerning the generation and the distribution of electrostatic charges do not claim to be complete or absolutely correct; it is well known that it is extremely difficult to establish the origin and/or the quantities of such charges, since electrostatic charges are ubiquitous and hence unavoidably affect the results of measurements.

Figure 2:
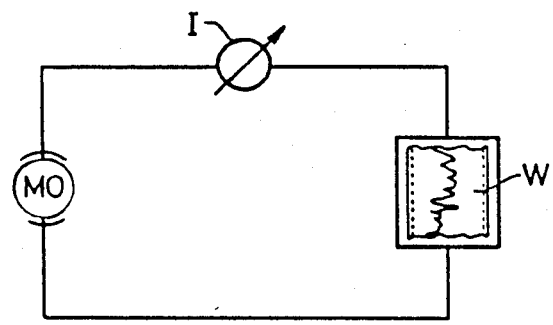
Figure 3:
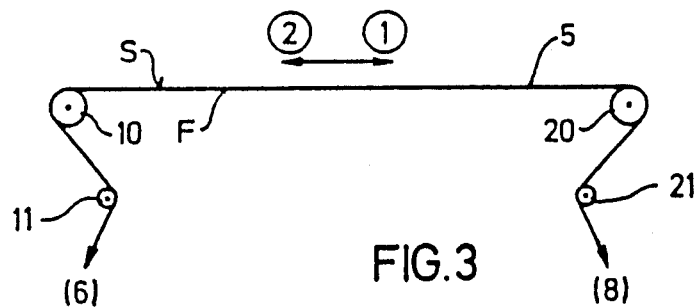
Figure 3A:
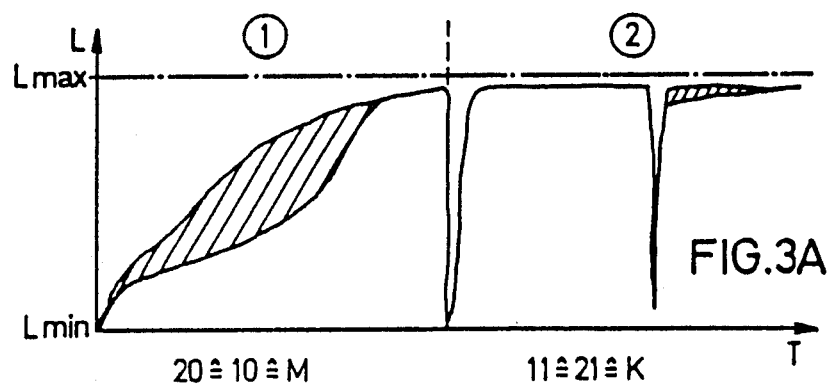
Figure 3B:
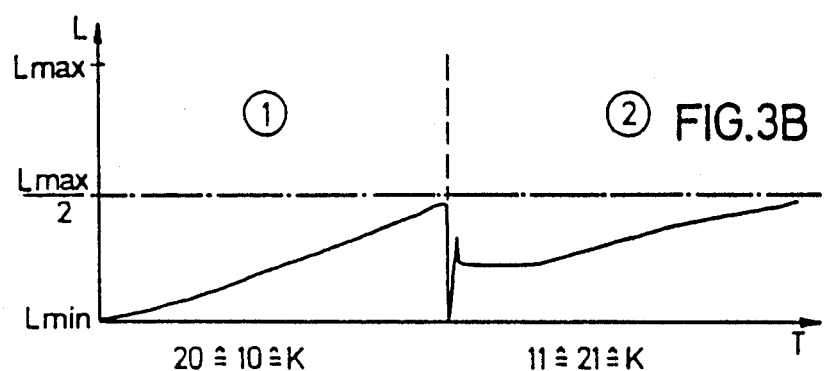
Figure 4A:
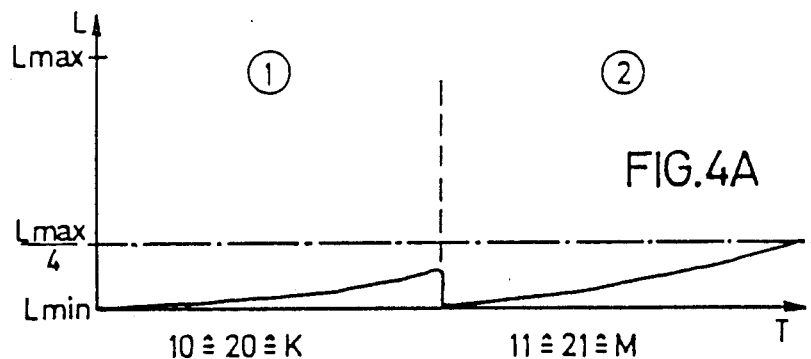
Figure 4B:
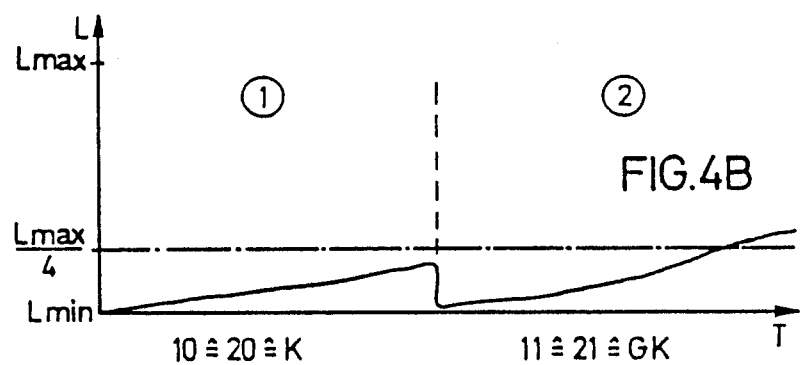
Figure 5A:
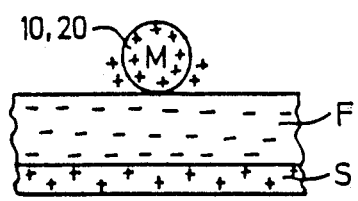
Figure 5B:
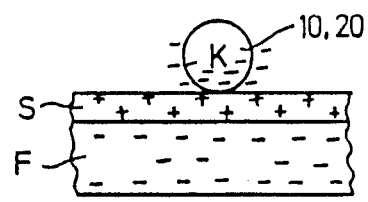
Figure 6:
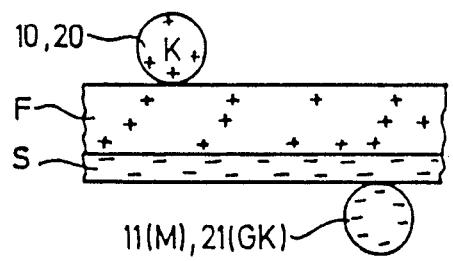

Further details of the invention are disclosed in the following description of the embodiments illustrated in the accompanying drawing, in which FIG. 1 shows a conventional magnetic tape transport arrangement, FIG. 2 shows a circuit to measure the motor current, FIG. 3 shows a tape guide system in a magnetic tape cassette, FIG. 3A shows a motor load diagram for a chromium dioxide magnetic tape in a system according to FIG. 3, employing conventional guide element materials, FIG. 3B shows a motor load diagram for the same magnetic tape in the same guide system but with contact members made exclusively of plastic, FIGS. 4A, 4B show a motor load diagram according to FIG. 3B but with contact members 11, 21 made of plastic (FIG. 4A) or a graphite/plastic mixture (FIG. 4B), and FIGS. 5A, 5B and 6 diagrammatically show the various charge distributions.

A tape guide system 4 essentially comprises a magnetic tape 5 having a front face S and back face F, which tape is wound from a supply reel 6 on a spool 7 onto a take-up reel 8 on a spool 9, or vice versa.

Whilst travelling from reel 6 to reel 7, the tape moves over tape guide elements 10 and 11, in general guide rollers or guide pins; usually, contact with the magnetic head (not shown) takes place between the guide elements. The areas of contact between the tape 5 and the element 10 or 20 depend on the wrap-round angle of the tape 5 on these guide elements.

FIG. 2 represents a simplified circuit for motor load measurement, by means of which the current for the tape transport drive motor MO is determined, shown on the instrument I and recorded by means of the per recorder W. This circuit is insensitive to extraneous electrostatic charges, so that it is very suitable for the indirect determination of faults arising from electrostatic sticking and blocking.

FIG. 3 represents a tape guide system in a conventional video cassette (VHS system). 10 and 20 are the guide pins and 11 and 21 the guide rollers. The tape ends lead to the peripheries of the tape reels 6 and 8, not shown in the drawing. The forward and rewind directions of the tape 5 are marked 1 and 2 and are also indicated in the subsequent measurement diagrams. On switching over from forward wind to rewind, there is in each case an interruption in the motor current, and this is also shown in the diagrams.

The magnetic tape used in the test systems referred to below is a commercial video tape with a chromium dioxide magnetic layer having a surface resistivity, measured by means of test contacts on the coated side, of about $10^6 \Omega$. Such chromium dioxide tapes generally have layers with surface resistivities of from about $10^5$ to $4.10^7 \Omega$ depending on the nature of the chromium dioxide material, the size of the chromium dioxide particles, the volumetric packing density of the coating, the additives which may be employed to incresse the ion conductivity of the coating, and the binders. The tape base material usually has a surface resistivity of from $10^{12} \Omega$ to $10^{14} \Omega$. In this connection it may be noted that the dictionary definition of surface resistivity is "The electric reistance of the surface of an insulstor measured between the opposite sides of a square on the surface; the value in ohms is independent of the size of the square and the thickness of the surface film." Thus, a customary measuring device comprises a two-part two-pole surface against which the tape rests flat during measurement, and a resistance-measuring bridge. The surface resistivity for a given square area of tape is measured in $\Omega$.

The conventional standard version of the guide elements 10 and 20, and 11 and 21, is as follows: 10 and 2 are metal pulleys located on plastic axles fixed to the cassette (this being indicated for brevity in the drawing by 10=M and 20=M, M standing for metal), and 21 is a plastic roller, for example made of polyoxymethylene (this being indicated for brevity in the drawing by 21=K, where K stands for plastics). 11 is usually a metal pin.

The materials used in the various test arrangements are thus indicated in the drawing. In the first test, the trace shown in diagram 3A was obtained. The forward and rewind speeds of the tape in the cassette were about 0.8 m/sec.

On forward operation 1, the shaded area corresponded to a stick-slip effect, which manifests itself as a deafening noise. The effect resulted from numerous brief blockages between the back F of the tape 5 and the metal pulleys 10 and 20. In the shaded area, the trace showed a constant succession of load changes of the motor MO, essentially between the full load Lmax and half the full load Lmax/2.

In zone 2, ie. during rewind, the stick-slip effect did not occur, but about half-way through the rewind period the motor current dropped briefly and then rose again.

Accordingly, a guide system according to FIG. 3A is compleely unsuitable for recording signals of any kind whatsoever.

In FIG. 3B, the test arrangement was modified compared to 3A by replacing the metal pulleys by plastic pulleys 10 and 20. The motor load variation shows an approximately linear increase in motor current to about Lmax/2 in both forward and rewind operation. This means that the change in load of the drive motor is still excessive, though recording and playback of signals is possible.

In evaluating these two adverse test results, we found the following surprising explanation.

With the arrangement corresponding to FIG. 3A, high and differing static charges occurred between the metal pulleys 10 and 20 and the back F of the tape 5, and also between the rollers 11 and 12 and the front S of the tape 5; these charges led, in zone 1, to continual stick-slip effects.

These differing charges are most probably attributable to the very different charge affinity of the materials constituting the surfaces of the contact members; the table which follows compares the orders of magnitude of the surface resistivities of these materials.

| | Contact member | Surface resistivity ($\Omega$) |
|---|---|---|
| Tape | Front S | about $10^6$ |
| | Back F | about $10^{14}$ |
| Pins 10 and 20 (metal pulleys) | | about 0 |
| Rollers 11 and 21 (plastic) | | about $10^{12}$ |

Accordingly, there are the following differences in surface resistivity between contact members:

| Contact members | Surface resistivity ($\Omega$) | Difference ($\Omega$) |
|---|---|---|
| Back F | $10^{14}$ | — |
| Metal pins 10 and 20 | about 0 | $10^{14}$ |
| Plastic rollers 11 | $10^{12}$ | $10^6$ |

| Contact members | Surface resistivity ($\Omega$) | Difference ($\Omega$) |
|---|---|---|
| and 21 | | |
| Front S | $10^6$ | |

The charge differences are thus much too great if, as is assumed, the surface resistivities can be regarded as a measure of the charge affinity of the surfaces; this assumption seems physically reasonable and of course the surface resistivity is a more easily measured parameter. The charge affinity depends not only on the relative dielectric constants but also on the momentary nature of the surfaces involved. Another factor is that the ease with which the charges can be removed differs between, for example, the front and back of the tape, with charges being more difficult to remove from the back.

On the other hand, in Example 3B, where the metal pins 10 and 20 were replaced by plastic pins 10 and 20, the differences were as follows:

| Contact members | Surface resistivity ($\Omega$) | Difference ($\Omega$) |
|---|---|---|
| Back F | $10^{14}$ | $10^2$ |
| Plastic pins 10 and 20 | $10^{12}$ | | the plastic rollers 11 and 21 being kept unchanged. The correspondingly low charge difference at least permits continuous tape running, even though the power input rises progressively. Probably this is attributable to the charge difference increasing greatly during the forward wind period and during the rewind period.

Comparative experiments, using the same guide systems but magnetic tapes with iron oxide coatings and surface resistivities of $10^8$ to $10^{10}\Omega$ gave, by comparison, relatively trouble-free tape running.

"Charge difference" is to be understood, in the preceding and subsequent parts of this test, as meaning any type of difference between charges which face one another. The effects described can be caused either by charges of opposite sign and of identical or different magnitude, or by charges of the same sign and of identical or different magnitude. The conditions can change completely, even within a very short time, through changes in moisture content of the components concerned, or changes in atmospheric humidity. Relative dielectric constants are from about 2 to 4 for conventional plastics, from 10 to 16 for materials of poor conductivity and up to infinity for conductors.

Diagrams 4A and 4B show the results obtained by putting the findings of the invention into practice:

The plastic rollers 11 and 21 were replaced by a metal pin 11 and a metal roller 21, whilst retaining the stationary plastic pins 10 and 20.

The surface resistivity difference was then found to be:

| Contact members | Surface resistivity ($\Omega$) | Difference ($\Omega$) |
|---|---|---|
| Front S | $10^{16}$ | $10^6$ |
| Metal pins or rollers 11, 21 | about 0 | |

In FIG. 4B, the metal roller 21 was replaced by a graphite/plastic roller 21, and the following surface resistivity difference was found:

| Contact members | Surface resistivity (Ω) | Difference (Ω) |
| --- | --- | --- |
| Front S | $10^6$ | $10^2$ |
| Graphite/plastic roller 21 | $10^4$ | |

The graphite/plastic roller 21 consisted of a mixture of 70% or 60% of a polymethylene oxide copolymer (Ultraform R, a registered trademark of BASK Aktiengesellschaft, Ludwigshafen) and 30% or 40% of graphite, preferably natural graphite. Polyethylene can also be used as the plastic. Carbon, for example, can be used as a conductor instead of graphite. The mixture may also contain, for example, molybdenum sulfide in addition to the graphite or carbon, so as to further reduce friction.

In both cases, namely FIGS. 4A and 4B, the power required by the motor was about half that in FIG. 3B, so that it can be assumed that the effective amounts of charge were also halved.

In spite of the relatively great differences in surface resistivity, these differences as shown in FIGS. 4A and 4B, surprisingly, matter much less than in the case of non-conductors (see the results in FIG. 3B, which concern the range from $10^{12}$ to $10^{14}\Omega$). Hence, the range from 0 to $10^0\Omega$ (the maximum surface resistivity of a $Fe_2O_3$ magnetic tape according to DIN No. 45,512) is regarded as the advantageous range for materials used in guide elements for the front of the tape. Preferred materials for guide elements for chromium dioxide tapes have surface resistivities of up to $10^7\Omega$. The preferred range for the back of all types of tapes starts at about $10^{11}\Omega$ and ranges up to about $10^{16}\Omega$.

An attempted explanation of the blocking effect in FIGS. 3A and 3B is given below with the aid of the diagrams in FIG. 5:

Because of the friction of the film face (ie. the back) F of the tape against the metal pins 10 and 20, the metal releases large quantities of free electrons to the film F and thereby itself acquires a more positive charge. Because of the charges of opposite sign facing one another, a blocking effect occurs. In the case of FIG. 5B, free electrons—though in smaller numbers than in 5A—migrate, this time from the coated (front) face S, to the surface of the plastic pins 10 and 20. As a result of the attraction of the different amounts of charge, blocking occurs to a lesser extent than in 5A.

Additionally, it must be assumed in both cases that because of the unwinding of the tape from the reel there is in any case an increased amount of charge on the film F, which further intensifies blocking or sticking.

It is very probable that in diagram 3A the film F carries with it negative charges which are wiped off on the metal pin 10 and stored in the manner of a condenser, whilst on the more conductive layer corresponding positive charges accumulate, thereby causing relatively strong electrostatic attraction forces between the pin 10 and coating S.

FIG. 6 shows the probable charge conditions with the arrangement which gave the results depicted in FIGS. 4A and 4B.

The plastic pin 10, 20 on the back F carries a slight positive charge, as does the film itself, so that the most which occurs is a slight force of repulsion which is more desirable than a force of attraction.

Similar conditions arise in the case of the graphite/plastic roller 21 and the metal pin 11, except that negative charges face on another.

We claim:

1. A tape guide system for magnetic tapes, especially video tapes, having a film face and a coated face, said system comprising a first passive tape guide element and a second passive tape guide element having contact members, said contact members being at least partially in contact with the film face, ie. back, and the coated face ie. front, of the magnetic tape, respectively, the film face and the coated face having different electrical surface resistivities wherein the contact members of said first and said second tape guide elements each consist of a material whose electrical surface resistivity essentially corresponds to that of the respective face of the tape, whereby the occurrence of electrostatic charge differences on the mutually contacting faces is minimized even in the absence of provisions of electrical connections for the discharge of such electrostatic charges.

2. A tape guide system for magnetic tapes, more especially video tapes, having a film face and a coated face, said system comprising a first passive tape guide element and a second passive tape guide element having contact members, said contact members being at least partially in contact with the film face, ie. back, and the coated face, ie. front, of the magnetic tape, respectively, the film face and the coated face having different charge affinities, wherein the contact members of said first tape guide element consist of a material which has about the same charge affinity as the charge affinity of the film face, and the contact members of said second tape guide element consist of a material which has about the same charge affinity as the charge affinity of the coated face, whereby the occurrence of electrostatic charge differences on the mutually contacting faces is minimized even in the absence of provisions of electrical connections for the discharge of such electrostatic charges.

3. A system as claimed in claim 1 or 2, wherein the contact members of the guide elements for the front of the tape consist of conductive material whilst those for the back of the tape consist of insulating material.

4. A system as claimed in claim 1 or 2, wherein the contact members of the guide elements for the front of the tape consist of a low-insulation material having a surface resistivity below about $10^{10}$ ohms whilst the contact members of the guide elements for the back of the tape consist of a high-insulation material having a surface resistivity of the order of not less than $10^{11}$ ohms and up to about $10^{16}$ ohms.

5. A system as claimed in claim 2, wherein the contact members of the guide elements for the front of the tape consist of a material of poor conductivity having a surface resistivity of up to $10^5$ ohms.

6. A system as claimed in claim 5, wherein the contact members of the tape guide elements which are allotted to the front of the tape consist of a plastic containing an electrically conductive additive such as graphite or carbon.

7. A system as claimed in claim 6, wherein the plastic mixture consists of from 80 to 60% by weight of polyoxymethylene and from 20 to 50% by weight of graphite or carbon additive.

8. A system as claimed in claim 1 or 2, wherein the contact members allotted to the front of the tape consist of a material having a similar surface resistivity to that of the magnetic coating.

9. A system as claimed in claim 2, wherein the coating of the tape is of chromium dioxide and wherein the contact members allotted to the front of the tape possess one or more layers of chromium dioxide magnetic particles in a binder.

10. A system as claimed in claim 2, wherein the film base of the tape consists of a plastic and the contact members for the back of the tape consist of the same plastic as the film base of the tape.

11. A system as claimed in claim 10, wherein the contact members of the tape guide element are provided with a film material which essentially corresponds to the film base of the tape.

12. A magnetic tape cassette having a tape guide system for a magnetic tape having a film face and a coated face, said system consisting of first and second passive tape guide elements having contact members, said contact members being at least partially in contact with the film face, ie. back, and the coated face, ie. front, of the magnetic tape, respectively, the film face and the coated face having different electrical surface resistivities, wherein the contact members of said first and said second tape guide elements each consist of a material whose electrical surface resistivity essentially corresponds to that of the respective face of the tape, whereby the occurrence of electrostatic charge differences on the mutually contacting faces is minimized and audible and/or visible errors in the reproduction of the tape due to tape winding problems are substantially reduced or eliminated even in the absence of provisions of electrical connections for the discharge of such electrostatic charges.

13. A cassette as claimed in claim 12, wherein the contact members of the guide elements for the front of the tape consist of a low-insulation material having a surface resistivity below about $10^{10}$ ohms whilst the contact members of the guide elements (10,20) for the back of the tape consist of a high-insulation material having a surface resistivity of the order of not less than $10^{11}$ ohms and up to about $10^{16}$ ohms.

14. A cassette as claimed in claim 12, wherein the contact members for the front of the tape consist of a conductive material and the contact members for the back of the tape consist of an insulating material.

15. A cassette as claimed in claim 12, wherein the contact members consist of a low-conductivity material having a surface resistivity of up to $10^5$ ohms.

16. A cassette as claimed in claim 12, wherein the contact members of the tape guide elements which are allotted to the front of the tape consist of a plastic containing an electrically conductive additive such as graphite or carbon, and wherein the plastic mixture consists of from 80 to 60% by weight of polyoxyethylene and from 20 to 50% by weight of graphite or carbon additive.

17. A cassette as claimed in claim 12, wherein the contact members allotted to the front of the tape consist of a material having a similar surface resistivity to that of the magnetic coating.

18. A magnetic tape cassette, especially video tape cassette, including a tape guide system for the magnetic tape, having a film face and a coated face, said system comprising a first passive tape guide element and a second passive tape guide element having contact members, said contact members being at least partially in contact with the film face ie. back, and the coated face, ie. front, of the magnetic tape, respectively, the film face and the coated face having different electrical surface resistivities, wherein the contact members of said first and said second tape guide elements each consist of a material whose electrical surface resistivity essentially corresponds to that of the respective face of the tape, whereby the occurrence of electrostatic charge differences on the mutually contacting faces is minimized even in the absence of provisions of electrical connections for the discharge of such electrostatic charges, and wherein the contact members of the guide elements for the front of the tape consist of a material of poor conductivity having a surface resistivity of up to $10^5$ ohms, namely a plastic containing an electrically conductive additive such as graphite or carbon.

19. A tape guide system for magnetic tapes, especially video tapes, having a film face and a coated face, said system comprising a first passive tape guide element and a second passive tape guide element having contact members, said contact members being at least partially in contact with the film face, ie. back, and the coated face ie. front, of the magnetic tape, respectively, the film face and the coated face having different charge affinities, wherein the contact members of said first tape guide element consist of a tape material which has the same charge affinity as the charge affinity of the film face, and the contact members of said second tape guide element consist of a material which has the same charge affinity as the charge affinity of the coated face, whereby the occurrence of electrostatic charge differences on the mutually contacting faces is minimized even in the absence of provisions of electrical connections for the discharge of said electrostatic charges, and wherein the contact members of the guide elements for the front of the tape consist of a material of poor conductivity having a surface resistivity of up to $10^5$ ohms, namely a plastic containing an electrically conductive additive such as graphite or carbon.

20. A magnetic tape cassette, especially video tape cassette, including a tape guide system for magnetic tapes, especially video tapes, having a film face and a coated face, said system comprising a first passive tape guide element and a second passive tape guide element having contact members, said contact members being at least partially in contact with the film face, ie. back, and the coated face ie. front, of the magnetic tape, resectively, the film face and the coated face having different electrical surface resistivities, wherein the contact members of said first and said second tape guide elements each consist of a material whose electrical surface resistivity essentially corresponds to that of the respective face of the tape, whereby the occurrence of electrostatic charge differences on the mutually contacting faces is minimized even in the absence of provisions of electrical connections for the discharge of such electrostatic charges, wherein the coating of the tape is of chromium dioxide, and wherein the contact members allotted to the front of the tape possess one or more layers of chromium dioxide magnetic particles in a binder.

* * * * *